United States Patent
Nishiyama et al.

[11] Patent Number: 5,957,462
[45] Date of Patent: Sep. 28, 1999

[54] SEAL STRUCTURE BETWEEN A ROTATABLE MEMBER AND A STATIONARY MEMBER

[75] Inventors: Tomohiko Nishiyama; Kazuhisa Mitani, both of Toyota, Japan

[73] Assignee: Toyota Jidosha Kabushiki Kaisha, Toyota, Japan

[21] Appl. No.: 08/856,579

[22] Filed: May 15, 1997

[30] Foreign Application Priority Data

May 17, 1996 [JP] Japan .................................. 8-122926
Apr. 10, 1997 [JP] Japan .................................. 9-092605

[51] Int. Cl.⁶ ...................................................... F16J 15/16
[52] U.S. Cl. .......................................... 277/580; 277/582
[58] Field of Search ..................................... 277/910, 579, 277/580, 582, 587; 431/215; 432/180, 181; 165/4, 5, 6, 7, 8, 9, 10

[56] References Cited

U.S. PATENT DOCUMENTS

| | | | |
|---|---|---|---|
| 429,440 | 6/1890 | Gordon | 431/215 |
| 2,480,229 | 8/1949 | Dow | 277/910 X |
| 3,212,558 | 10/1965 | Williams | 431/215 X |
| 3,262,484 | 7/1966 | Hess | 431/215 X |
| 3,556,538 | 1/1971 | Muller | 277/579 |
| 4,073,548 | 2/1978 | Walters . | |
| 4,500,098 | 2/1985 | Wilcox et al. . | |
| 4,604,051 | 8/1986 | Davies et al. . | |
| 5,378,000 | 1/1995 | Orlowski . | |
| 5,562,442 | 10/1996 | Wilhelm | 432/180 X |
| 5,704,461 | 1/1998 | Vastsaas et al. | 277/910 X |

FOREIGN PATENT DOCUMENTS

| | | |
|---|---|---|
| 1084990 | 2/1959 | Germany . |
| 37-26514 | 10/1972 | Japan . |
| 37-26515 | 10/1972 | Japan . |
| 53-6746 | 2/1978 | Japan . |
| 6-221545 | 8/1994 | Japan . |
| WO 95/20731 | 8/1995 | WIPO . |

*Primary Examiner*—Lynne A. Reichard
*Assistant Examiner*—John R. Cottingham
*Attorney, Agent, or Firm*—Pillsbury Madison & Sutro LLP

[57] ABSTRACT

A seal structure includes a stationary member, a rotatable member disposed within the stationary member to divide an interior of the stationary member into two chambers, a seal member mildly pressed to the stationary member and the rotatable member, and a recess for collecting grease, formed in the rotatable member. The seal structure can be used as a seal between a rotatable member and a stationary member of an air supply and gas exhaust switching mechanism of a regenerative combustion burner.

10 Claims, 2 Drawing Sheets

SEAL STRUCTURE BETWEEN A ROTATABLE MEMBER AND A STATIONARY MEMBER

This application is based on application Nos. HEI 8-122926 filed in Japan on May 17, 1996 and HEI 9-92605 filed in Japan on Apr. 10, 1997, the contents of which are incorporated hereinto by reference.

BACKGROUND OF THE INVENTION

1. Field of the Invention

The present invention relates to a seal structure between a rotatable member and a stationary member.

2. Description of Related Art

Usually, a mechanical seal is used as a seal between a rotatable member and a stationary member. The mechanical seal structure is selected from various types of seals taking into consideration conditions of use, for example, pressure, temperature, rotational speed, and whether a small amount of leakage is permitted or not, etc.

In the case where the seal is disposed at a slidably contacted portion and is exposed to a relatively high temperature above 200° C. and a relatively low pressure, an O-ring is not usually used. This is because an O-ring is used only as a seal between stationary members or as a seal between a reciprocally movable member and a stationary member, because a high pressure is needed for a portion of the O-ring to be deformed and to enter a clearance between two members, and because a metallic O-ring, which is usually used at high temperatures above about 200° C., has a poor sealing characteristic as compared with a rubber O-ring.

However, because the mechanical seals are designed so as to endure high pressure, high temperature and high rotational speed conditions, they are usually complicated in structure and high in cost.

SUMMARY OF THE INVENTION

An object of the present invention is to provide a seal structure between a rotatable member and a stationary member, having a simple structure and capable of being used under relatively low pressure and relatively low rotational speed conditions.

A seat structure between a rotatable member and a stationary member according to the present invention includes (a) a stationary member having an interior therein, (b) a rotatable member rotatably disposed within the stationary member and dividing the interior of the stationary member into a first chamber and a second chamber which has a higher pressure than the first chamber, (c) a seal member for a seal between the first chamber and the second chamber and made from an elastic ring, the seal member being pressed to the rotatable member and the stationary member at a first contact portion and a second contact portion, respectively, which are located on one radial side of the seal member due to a radial force generated by a hoop stress in the seal member; and (d) a recess for collecting grease formed in at least one of the rotatable member and the stationary member, the recess being located on the second chamber side of the seal member.

Preferably, the rotatable member and the stationary member define a gap between the first contact portion and the second contact portion. The rotatable member includes a first seal surface at which the rotatable member contacts the seal member and the stationary member includes a second seal surface at which the stationary member contacts the seal member. The first seal surface and the second seal surface have tapers spreading in a direction away from the gap toward the seal member.

In a case where the seal structure is applied to a regenerative combustion burner, the rotatable member and the stationary member are a rotatable member and a stationary member, respectively, of a supply air and exhaust gas switching mechanism of a regenerative combustion burner. The first chamber and the second chamber are a chamber permitting exhaust gas to flow therethrough and a chamber permitting supply air to flow therethrough, respectively, of the regenerative combustion burner.

In a case where the seal member is exposed to a relatively high temperature, above about 150° C., it is preferable that the first contact portion and the second contact portion are located radially inside of the seal member.

In a case where the seal member is exposed to a relative low temperature below about 150° C., the first contact portion and the second contact portion may be located radially outside of the seal member.

The above-described seal structure according to the present invention can be used under a relatively low rotational speed condition (for example, below 10 rpm) and a relatively low pressure condition (for example, below 800 mmH$_2$O (7,840 Pa)).

Since the seal member is pressed to the first seal surface and the second seal surface due to the radial force generated by the hoop stress itself, the pressing force is mild so that the seal member is not deformed so as to cause sticking. Further, since the recess for collecting grease is provided and the grease is supplied to the seal member, deformation of the seal member is effectively prevented. Since the recess for collecting grease is located on the second chamber side of the seal member, even if the seal member leaks, the grease flows toward the seal member due to an air flow generated due to the air leakage and will stop the leakage at the seal member. Since the seal structure is no more than disposing the seal member at the portion to be sealed, the seal structure is very simple.

Since the first and second seal surfaces are tapered, the seal member is prevented from moving away from the gap so that the seal is reliable.

Since the rotational speed of the rotational member of the air supply and gas exhaust switching mechanism of the regenerative combustion burner is lower than about 10 rpm and the pressure difference between the supply air and exhaust gas is about 800 mmH$_2$O (7,840 Pa), the seal structure can be used as a seal between the rotational member and the stationary member of the air supply and gas exhaust switching mechanism of the regenerative combustion burner.

In this instance, in a case where the seal member is heated to a temperature above about 150° C. by the exhaust gas flowing through the air supply and gas exhaust switching mechanism, since the rubber thermally shrinks, it is preferable that the first contact portion and the second contact portion are located radially inside of the seal member so that the seal is maintained. In a case where the seal member is heated to a temperature below 150° C. at maximum, the first contact portion and the second contact portion may be located radially outside of the seal member so that the pressure difference can be used for pressing the seal member to the first seal surface and the second seal surface as well as the hoop stress of the seal member itself.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
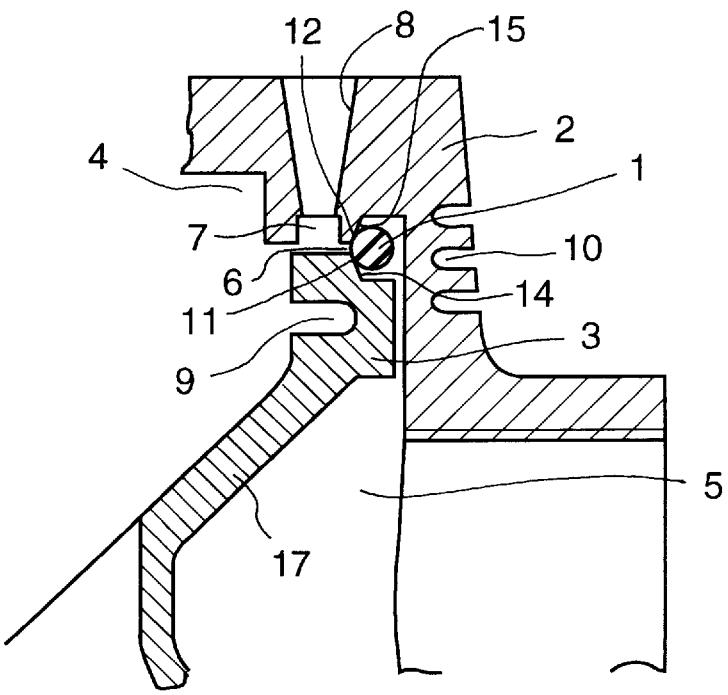
FIG. 1 is a cross-sectional view of a seal structure between a rotatable member and a stationary member according to a first embodiment of the present invention.
Figure 2:
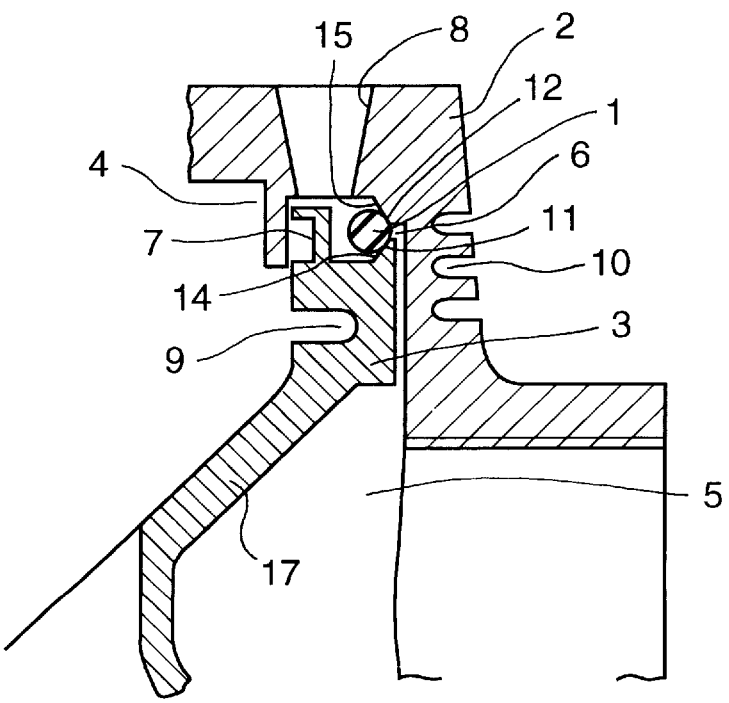
FIG. 2 is a cross-sectional view of a seal structure between a rotatable member and a stationary member according to a second embodiment of the present invention.
Figure 3:
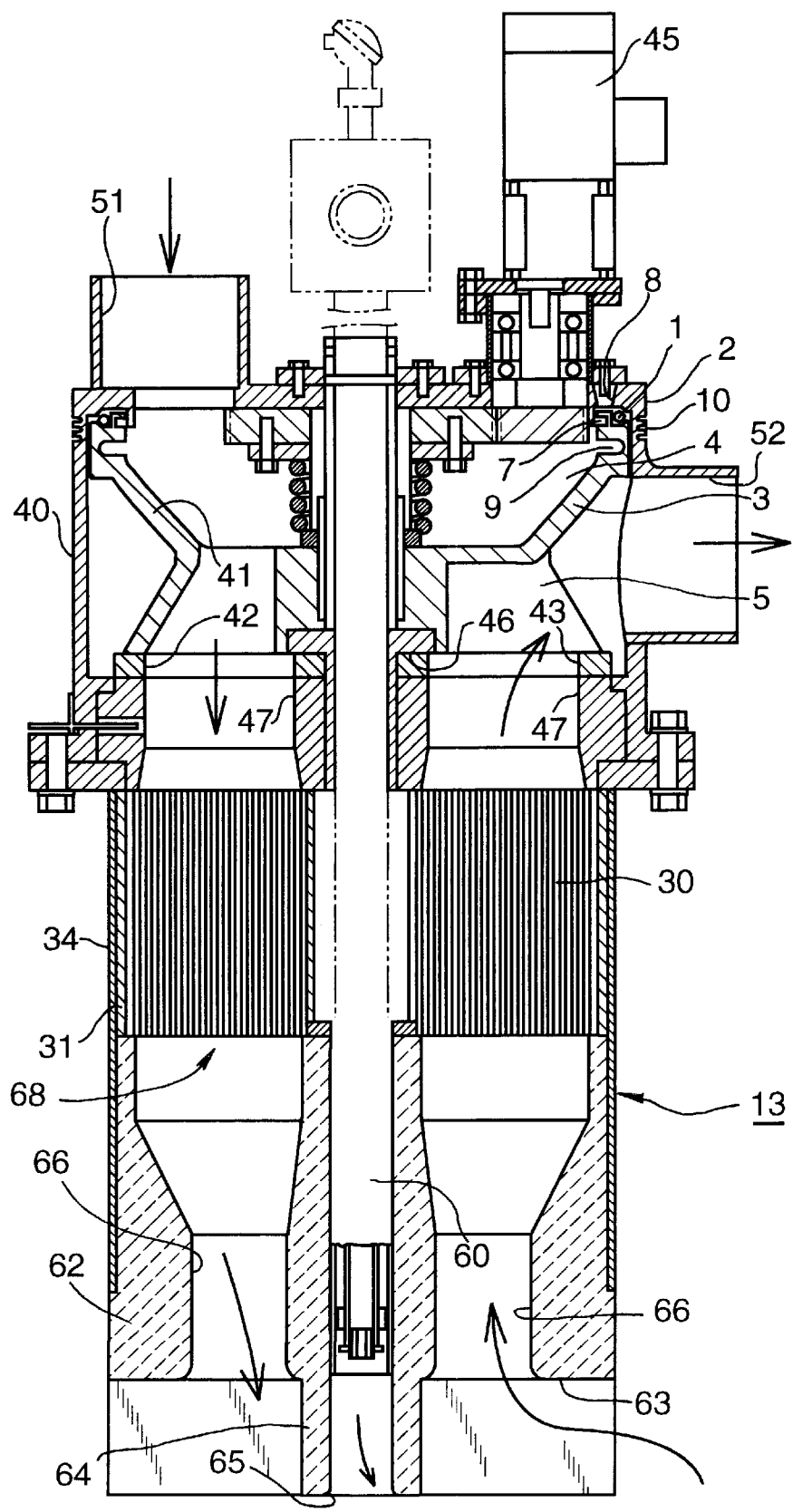
FIG. 3 is a cross-sectional view of a regenerative combustion burner to which the seal structure according to the first embodiment of the present invention is applied.

FIGS. 1 and 3 illustrate a seal structure according to a first embodiment of the present invention, and FIG. 2 illustrates a seal structure according to a second embodiment of the present invention. Portions common or similar to all of the embodiments of the present invention are denoted with the same reference numerals throughout all of the embodiments of the present invention.

First, portions common or similar to all of the embodiments of the present invention will be explained with reference to, for example, FIGS. 1 and 3.

As illustrated in FIG. 1, a seal structure between a rotatable member and a stationary member according to any embodiment of the present invention includes a stationary member 2 having an interior therein, a rotatable member 3 rotatably disposed within the stationary member 2 and dividing said interior of the stationary member 2 into a first chamber 5 and a second chamber 4 having a higher pressure than the first chamber 5, a seal member 1 as a seal between the first chamber 5 and the second chamber 4, and a recess 7 for collecting grease formed in at least one of the rotatable member 3 and the stationary member 1.

The seal member 1 is a solid or hollow ring made from elastic material (for example, rubber, synthetic resin, and metal). The seal member 1 is continuous in the circumferential direction thereof. The seal member 1 is pressed to the rotatable member 3 and the stationary member 2 at a first contact portion 11 and a second contact portion 12, respectively. The first contact portion 11 and the second contact portion 12 are located on one radial side of the seal member 1. The seal member 1 is pressed to the rotatable member 3 and the stationary member 2 at the first contact portion 11 and the second contact portion 12 due to a radial force generated by a hoop stress acting in the seal member 1. The first contact portion 11 and the second contact portion 12 constitute a seal between the first chamber 5 and the second chamber 4.

The rotational member 3 and the stationary member 2 define a gap 6 extending in a direction perpendicular to an axis of the seal member 1 between the first contact portion 11 and the second contact portion 12. The rotatable member 3 includes a first seal surface 14 at which the seal member 1 contacts the rotatable member 3, and the stationary member 2 includes a second seal surface 15 at which the seal member 1 contacts the stationary member 2. The first seal surface 14 and the second seal surface are tapered so as to spread in a direction away from the gap 6 toward the seal member 1.

The recess 7 for collecting grease (lubricant) is formed in at least one of the rotatable member 3 and the stationary member 2. The recess 7 is located on a second chamber side of the seal member 1. For a preferred embodiment, the recess 7 is filled with grease, although other lubricants may be used. The grease decreases a sliding resistance between the seal member 1 and the rotatable member 3 and helps to improve the sealing characteristic of the seal member by filling a very small gap between the seal member and the rotatable and stationary members.

The reason why the recess 7 is located on a second chamber (a higher pressure chamber) side of the seal member 1 is that when the seal portion leaks, the air will flow from the higher pressure chamber to the lower pressure chamber and the grease will flow in the same direction as the leaking air flow, so that the grease flows toward the seal portion to fill the leaking gap.

In the vicinity of the recess 7 for collecting grease, a grease supply hole 8 is formed in the stationary member 2. When the amount of grease decreases, grease is supplied to the recess 7 through the hole 8.

In the case of a seal structure for an air supply and gas exhaust switching mechanism of a regenerative combustion burner 13, the rotational speed of the rotatable member 1 is relatively low, for example, equal to or lower than 100 rpm, and more particularly, equal to or lower than 10 rpm.

In the case of the seal structure for the air supply and gas exhaust switching mechanism of the regenerative combustion burner 13, the pressure difference between the pressures in the first and second chambers 4 and 5 is also relatively low, for example, equal to or lower than 2,000 mmH$_2$O (19,600 Pa), but higher than 0 mmH$_2$O (0 Pa). More particularly, the pressure of the second chamber (where supply air flows) is about 1,200 mmH$_2$O (11,760 Pa), and the pressure of the first chamber (where exhaust gas flows) is about 400 mmH$_2$O (3,920 Pa). The pressure difference is about 800 mmH$_2$O (7,840 Pa).

In the case of the seal structure for the air supply and gas exhaust switching mechanism of the regenerative combustion burner 13, since the portion where the seal member 1 is disposed is exposed to a temperature between a room temperature to 300° C., more particularly, a temperature of 100 to 250° C., a heat resistant rubber including a silicone rubber is used as rubber for the seal member 1.

The above-described seal structure can be used as a seal mechanism of the air supply and gas exhaust switching mechanism 40 of the single-type regenerative combustion burner 13.

As illustrated in FIG. 3, the single-type regenerative combustion burner 13 includes a casing 34, a heat storage member 30 (made from, for example, ceramics) which is a gas passable member and is housed in each cylinder 31 disposed within the casing 34, a burner tile 62 disposed on one axial side of the heat storage member 30, the air supply and gas exhaust switching mechanism 40 disposed on the other axial side of the heat storage member 30, and a fuel supply nozzle (fuel expelling nozzle) 60 extending through the air supply and gas exhaust switching mechanism 40 and the heat storage member 30 to the burner tile 62.

The heat storage member 30 retrieves a portion of heat of the exhaust gas (having a temperature above about 1,000° C.) to store the heat therein and to reduce the temperature of the exhaust gas to about 250° C. when the exhaust gas flows through the heat storage member 30, and releases the heat to the supply air for combustion (having a temperature substantially equal to the ambient temperature) to preheat the supply air to about 900° C. when flow in the heat storage member is switched from the exhaust gas flow to a supply air flow. The transverse cross-section of the heat storage member 30 is divided into a plurality of sections. When the exhaust gas flows through some part of the sections, the supply air flows through the remaining sections. Air supply and gas exhaust is alternately switched by the air supply and gas exhaust switching mechanism 40.

The burner tile 62 is made from ceramics or heat-resistant metals. The burner tile 62 includes an air supply and gas exhaust surface 63 and a protrusion 64 protruding ahead from the air supply and gas exhaust surface 63. A fuel release surface 65 is formed from an inside surface of the protrusion 64 to a front end surface of the protrusion 64. A plurality of air supply and gas exhaust holes 66 are formed in the burner tile and are open to the air supply and gas exhaust surface 63. The air supply and gas exhaust holes 66 and the plurality of sections of heat storage member 30 are in a one-to-one correspondence with each other. Therefore, when the exhaust gas flows through a part of the air supply and gas exhaust holes 66, the supply air flows through the remaining part of the air supply and gas exhaust holes 66.

As illustrated in FIGS. 1 and 3, the air supply and gas exhaust switching mechanism 40 includes the rotatable member 3, the stationary member 2 and a dividing wall 41. The stationary member 2 includes a plurality of penetration holes 47 in a one-to-one correspondence with the sections of the heat storage member 30. The rotatable member 3 includes an aperture 42 formed on one side of the dividing wall 41 and another aperture 43 formed on the other side of the dividing wall 41. The aperture 42 communicates with a supply air inlet 51 and the aperture 43 communicates with an exhaust gas exit 52. The rotatable member 3 is rotated in one direction, or in opposite directions, by a drive device 45 (a motor or a cylinder). By rotating the rotatable member 3 such that the penetration hole 47, which had been coincident with the aperture 42, comes into coincidence with the aperture 43 and the penetration hole 47, which had been coincident with the aperture 43, comes into coincidence with the aperture 42, air supply and gas exhaust through the heat storage member 30 and the air supply and gas exhaust holes 66 are switched.

The seal structure is applied to the seal mechanism between the rotatable member 3 and the stationary member 2. An interior of the stationary member 2 of the air supply and gas exhaust switching mechanism 40 is divided into the first chamber 5 and the second chamber 4 by the rotatable member 3. Supply air flows through the second chamber 4 and exhaust gas flows through the first chamber 5. A pressure of the supply air is, for example, 1,200 mmH$_2$O (11,760 Pa) and is higher than a pressure of the exhaust gas (for example, 400 mmH$_2$O (3,920 Pa)). Therefore, there is a pressure difference between the two chambers 4 and 5. Further, the temperature of the supply air is room temperature, and the temperature of the exhaust gas at a downstream end of the heat storage member in the exhaust gas flow direction (opposed to a downstream end 68 of the heat storage member 30 in the supply air flow direction) is about 25° C. The recess 7 for collecting grease is formed on the second chamber side of the seal member 1. The grease supply hole 8 is formed in the stationary member 8.

As illustrated in FIG. 1, the rotatable member 3 has a portion 17 which is exposed to an exhaust gas flow. A groove 9 is formed in the rotatable member 3 between the portion 17 and the first contact portion 11. The groove 9 is open to the second chamber 4. When the supply air at room temperature flows in the groove 9, the air takes away heat which is conducted from the wall of the portion 17 toward the first contact portion 11 to cool the portion where the seal member 1 is disposed. To cool the portion where the seal member 1 is disposed more strongly, a fin structure having at least one fin 10 exposed to the atmosphere is formed in a portion of the stationary member 2 which is located radially outside of the seal member 1 so that the portion where the seal member 1 is disposed can be cooled due to heat convection at the fin structure.

Due to this structure, though the exhaust gas temperature is about 250° C., the temperature at the portion where the seal member 1 is disposed is suppressed to a temperature lower than 200° C. As a result, the seal member 1 is permitted to be made from rubber. More particularly, an O-ring made from rubber (heat-resistant rubber) having a solid or hollow cross-section is used as the seal member 1.

The operation of the seal structure will now be explained.

Since the seal member 1 is mildly pressed to the rotatable member 3 and the stationary member 2 due to the radial force generated by the hoop stress of the seal member 1, a resistance between the rotatable member 3 and the seal member 1 is small. As a result, deformation and abrasion of the seal member 1 are prevented, resulting in increasing the life of the seal member 1.

Since the first seal surface 14 and the second seal surface 15 spread in the direction away from the gap 6, the seal member 1 is prevented from being dislocated from the gap so that the reliability of the seal structure is high.

Further, since the seal structure is obtained by merely disposing the seal member 1 so that the seal member 1 is pressed to the rotatable member 3 and the stationary member 2 at the first contact portion 11 and the second contact portion 12, respectively, the structure is very simple. As a result, great cost reduction is achieved, and maintenance is easy.

Since the recess 7 for collecting grease is located on the second chamber side of the seal member 1, the grease can easily flow toward the seal member 1 driven by a very small amount of leaking air which inevitably occurs at the seal member 1, thereby ensuring that grease is supplied to the seal member 1. Due to the supply of grease to the seal member 1, the seal member 1 is lubricated and abrasion of the seal member 1 is minimized. As a result, the life of the seal member 1 is increased, which reduces the number of times the seal member 1 has to be replaced.

By applying the seal structure to the seal mechanism of the air supply and gas exhaust switching mechanism 40 of the regenerative combustion burner, the operational reliability of the burner is improved and cost reductions of the burner are achieved. If air leakage occurs from supply air to exhaust gas in the switching mechanism 40, a ratio of the supply air to fuel deviates from that of the objective, so that imperfect combustion may occur and the combustion efficiency may be lowered due to a loss of supply air energy. However, in the present invention, those undesirable effects are reduced.

In the case where the groove 9 is provided in the rotatable member 3, a portion of supply air flows through the groove 9 to prevent the portion where the seal member 1 is disposed from rising in temperature. As a result, the seal member 1 is prevented from being thermally degraded, so that the life and the reliability of the seal structure are improved.

Further, in the case where the fin structure 10 is formed in the stationary member 2, the temperature of the portion where the seal member 1 is disposed is further prevented from rising.

Next, portions unique to each embodiment of the present invention will be explained.

With a first embodiment of the present invention, as may best be viewed in FIG. 1, the first contact portion 11 and the second contact portion 12 are located radially inside of the seal member 1. Also, the gap 6 is located radially inside of the seal member 1. In this instance, the hoop stress generated in the seal member 1 is a tensile stress which generates a radial force directed radially inwardly. Due to the radial force, the seal member 1 is pressed to the first seal surface 14 at the first contact portion 11 and to the second seal surface 15 at the second contact portion 12. The seal structure of the first embodiment of the present invention is used in the case where the temperature of the portion where the seal member 1 is disposed is relatively high, more particularly, equal to or higher than 150° C.

With an operation of the first embodiment of the present invention, when the portion where the seal member 1 is disposed is heated to a temperature above 150° C., the seal member 1 which is made from rubber shrinks due to the heat, the contact pressure between the seal member 1 at the first contact portion 11 and the second contact portion 12 increases so that the seal is enhanced. Though the pressure difference between the second chamber 4 and the first chamber 5 acts in a way to increase the diameter of the seal member 1, by designing the hoop force of the seal member 1 to be greater than a force acting on the seal member due to the pressure difference (proportional to the size of the gap 6), a net retaining force can acts at any time on the first contact portion 11 and the second contact portion 12.

With a second embodiment of the present invention, as may best be viewed in FIG. 2, the first contact portion 11 and the second contact portion 12 are located radially outside of the seal member 1. Also, the gap 6 is located radially outside of the seal member 1. In this instance, the hoop stress generated in the seat member 1 is a compressive stress which generates a radial force directed radially outwardly. Due to the radial force, the seal member 1 is pressed to the first seal surface 14 at the first contact portion 11 and to the second seal surface 15 at the second contact portion 12. The seal structure of the second embodiment of the present invention is used in the case where the temperature of the portion where the seal member 1 is disposed is relatively low, for example, lower than 150° C.

With an operation of the second embodiment of the present invention, since the temperature of the portion where the seal member 1 is disposed is relatively low, the thermal shrinkage of the seal member 1 is small. As a result, the contact pressure between the seal member 1 at the first contact portion 11 and the second contact portion 12 is little affected by the temperature of the seal member 1, so that the initial good seal is maintained. Further, since the pressure difference between the second chamber 4 and the first chamber 5 acts in a way to increase the diameter of the seal member 1, the seal is enhanced and a pressing force acts at any time on the first contact portion 11 and the second contact portion 12.

According to the present invention, the following technical advantages are obtained:

Since the seal member 1 is pressed to the first seal surface and the second seal surface due to the radial force generated by the hoop stress itself, the pressing force is mild so that the seal member is not deformed and does not cause sticking. Further, since the recess 7 for collecting grease is provided and the grease is supplied to the seal member, deformation and abrasion of the seal member 1 are effectively prevented. Since the seal structure is no more than disposing the seal member 1 at the portion to be sealed, the seal structure is very simple.

Since the first and second seal surfaces are tapered, the seal member is prevented from being dislocated from the gap so that the seal is reliable.

Since the rotational speed of the rotational member of the air supply and gas exhaust switching mechanism of the regenerative combustion burner is lower than about 10 rpm and the pressure difference between the supply air and exhaust gas is about 800 mmH$_2$O (7,840 Pa), the seal structure can be used as a seal between the rotational member and the stationary member of the air supply and gas exhaust switching mechanism of the regenerative combustion burner.

In the case where the groove 9 is provided, temperature rise of the portion where the seal member 1 is disposed is suppressed.

In the case where the fin structure 10 is provided, temperature rise of the portion where the seal member 1 is disposed is suppressed.

In the case where the first contact portion 11 and the second contact portion 12 are located radially inside of the seal member 1, a good seal is maintained even if the portion where the seal member 1 is disposed is heated to a temperature above about 150° C.

In the case where the first contact portion 11 and the second contact portion 12 are located radially outside of the seal member 1, a good seal is maintained when the portion where the seal member 1 is disposed is heated to a temperature below about 150° C., utilizing the radial force generated by the hoop stress and the pressure difference between the first chamber and the second chamber.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A seal structure between a rotatable member and a stationary member comprising:

a stationary member having an interior therein;

a rotatable member rotatably disposed within said stationary member and dividing said interior of said stationary member into a first chamber and a second chamber such that said second chamber has a higher pressure than said first chamber;

a seal member forming a seal between said first chamber and said second chamber made from an elastic ring, said seal member being pressed to said rotatable member and said stationary member at a first contact portion and a second contact portion, respectively, due to a radial force generated by a hoop stress in said seal member, wherein said first contact portion and said second contact portion are located on one radial side of said seal member; and a recess for collecting grease, formed in at least one of said rotatable member and said stationary member, said recess being located on a said second chamber side of said seal member;

wherein said rotatable member and said stationary member are members of an air supply and gas exhaust switching mechanism of a regenerative combustion burner, and said first chamber and said second chamber are a chamber permitting exhaust gas to flow therethrough and a chamber permitting supply air to flow therethrough, respectively.

2. A seal structure according to claim 1, wherein said seal member is made from rubber.

3. A seal structure according to claim 1, wherein said rotatable member and said stationary member define a gap between said first contact portion and said second contact portion, said rotatable member includes a first seal surface at which said rotatable member contacts said seal member and said stationary member includes a second seal surface at which said stationary member contacts said seal member, said first seal surface and said second seal surface having tapers spreading in a direction away from said gap toward said seal member.

4. A seal structure according to claim 1, wherein a rotational speed of said rotational member is lower than 100 rpm.

5. A seal structure according to claim 1, wherein a pressure difference between said first chamber and said second chamber is greater than a pressure of 0 mmH$_2$O but less than or equal to a pressure of 2,000 mmH$_2$O (19,600 Pa).

6. A seal structure according to claim 1, wherein said rotatable member includes a portion exposed to an exhaust gas flow, a groove communicating with said second chamber is formed at a portion of said rotatable member between said first contact portion and said portion exposed to an exhaust gas flow.

7. A seal structure according to claim 1, wherein stationary member includes a fin structure formed at a portion of said stationary member located radially outside of said seal member.

8. A seal structure according to claim 1, wherein said first contact portion and said second contact portion are located radially inside of a center of a cross-section of said seal member.

9. A seal structure according to claim 1, wherein said first contact portion and said second contact portion are located radially outside of a center of a cross-section of said seal member.

10. A sealing structure for maintaining a reliable seal between a rotatable member and a stationary member having a pressure on one side of the seal higher than a pressure on another side of the seal, comprising:

a stationary member defining an opening and having an interior therein;

a rotatable member rotatably disposed within the interior of said stationary member, dividing the interior of said stationary member into a first chamber and a second chamber, wherein the second chamber has a higher pressure than the first chamber;

a seal member forming a seal between the first chamber and the second chamber made from an elastic ring, said seal member being pressed to said rotatable member and said stationary member at a first contact portion and a second contact portion, respectively, due to a radial force generated by a hoop stress in said seal member, wherein the first contact portion and the second contact portion are located on one radial side of said seal member; and a recess formed in at least one of said rotatable member and said stationary member, said recess being located in the second chamber removed from the first and the second contact portion, and immediately adjacent to and communicating with the opening formed in said stationary member so that the opening in the stationary member and the recess form one continuous path wherein said rotatable member and said stationary member are members of an air supply and gas exhaust switching mechanism of a regenerative combustion burner, and said first chamber and said second chamber are a chamber permitting exhaust gas to flow therethrough and a chamber permitting supply air to flow therethrough, respectively.

* * * * *